United States Patent
Baratakke et al.

(10) Patent No.: US 8,639,834 B2
(45) Date of Patent: Jan. 28, 2014

(54) SELF-ADJUSTING APPLICATION HEARTBEAT MANAGEMENT

(75) Inventors: Kavitha Vittal Murthy Baratakke, Austin, TX (US); Nikhil Hegde, Austin, TX (US); Rashmi Narasimhan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 12/942,305

(22) Filed: Nov. 9, 2010

(65) Prior Publication Data

US 2012/0117572 A1    May 10, 2012

(51) Int. Cl.
*G06F 15/16* (2006.01)
*H04J 3/16* (2006.01)

(52) U.S. Cl.
USPC .......................................... 709/232; 370/465

(58) Field of Classification Search
USPC .................................... 709/230; 370/465, 229
See application file for complete search history.

(56) References Cited

U.S. PATENT DOCUMENTS

| | | | |
|---|---|---|---|
| 6,076,114 A * | 6/2000 | Wesley | 709/235 |
| 6,370,656 B1 * | 4/2002 | Olarig et al. | 714/23 |
| 6,748,550 B2 * | 6/2004 | McBrearty et al. | 714/4.5 |
| 6,782,492 B1 * | 8/2004 | Nakaso | 714/42 |
| 6,782,496 B2 | 8/2004 | Fleming | |
| 6,820,221 B2 | 11/2004 | Fleming | |
| 7,120,693 B2 | 10/2006 | Chnag et al. | |
| 7,523,197 B2 | 4/2009 | Castaneda et al. | |
| 7,571,247 B2 * | 8/2009 | Banerjee et al. | 709/232 |
| 7,613,976 B2 | 11/2009 | Ludwig et al. | |
| 2003/0101274 A1 * | 5/2003 | Yi et al. | 709/232 |
| 2004/0243702 A1 * | 12/2004 | Vainio et al. | 709/224 |
| 2006/0092901 A1 * | 5/2006 | Parantainen | 370/342 |
| 2007/0283002 A1 * | 12/2007 | Bornhoevd et al. | 709/224 |
| 2009/0023455 A1 * | 1/2009 | Gupta et al. | 455/453 |
| 2011/0264778 A1 * | 10/2011 | McGregor et al. | 709/223 |

OTHER PUBLICATIONS

TCP Header Format—http://www.freesoft.org/CIE/Course/Section4/8.htm (Jan. 8, 1998—Date verified using wayback machine).*
Chen et al; Toward an Understanding of the Processing Delay of Peer-to-Peer Relay Nodes, International Conference on Dependable Systems & Networks: Anchorage, Jun. 24-27, 2008, 410-419, Alaska,US.
Khedher et al; A Novel Overlay-Based Failure Detection Architecture for MANET Applications, ICON 2007, Concordia University & Research Ericsson Canada, Montreal, Quebec, Canada.

(Continued)

*Primary Examiner* — Michael Thier
*Assistant Examiner* — Brian Cox
(74) *Attorney, Agent, or Firm* — Garg Law Firm, PLLC; Rakesh Garg; Mark C. Vallone (57) ABSTRACT

A method, system, and computer program product for a self-adjusting application heartbeat management process are provided in the illustrative embodiments. A first application receives from a second application, a response message in response to a heartbeat message. Information is identified in the response message usable for computing a delay in a future response message for a future heartbeat message, such that the information communicates to the first application a system condition existing in the second data processing system where the second application is executing. A response time is adjusted using the information to form a modified response time. The future response message is received after the response time.

19 Claims, 5 Drawing Sheets

(56) References Cited

OTHER PUBLICATIONS

Bustos-Jimenez et al; Balancing Active Objects on a Peer to Peer Infrastructure, Proceedings of the XXV International Conference of the Chilean Computer Science Society (SCCC'05), 2005 IEEE, 1-7.

Nascimento et al; Dynamic Self-Scheduling for Parallel Applications with Task Dependencies, MGC'08 Dec. 1-6, 2008 Leuven, Belgium.

\* cited by examiner

SELF-ADJUSTING APPLICATION HEARTBEAT MANAGEMENT

BACKGROUND

1. Technical Field

The present invention relates generally to a computer implemented method, system, and computer program product for managing application-to-application communication. More particularly, the present invention relates to a computer implemented method, system, and computer program product for self-adjusting heartbeat management between applications communicating with each other.

2. Description of the Related Art

Data processing systems communicate with each other using a variety of data communication protocols. A communication protocol is essentially a set of rules that data processing systems must obey in establishing data communications using the protocol. Among other things, data communication protocols specify the structure in which the data should be exchanged, and syntax, semantics, and sequence of the communication building blocks to be used for such exchange. Transmission control protocol/Internet protocol (TCP/IP) is one example of data communication protocols.

Applications executing on different data processing systems may communicate with each other as well. An application may send a heartbeat to another application, and receive a response therefor, to ensure that the data communication pathway between the two applications is available. A heartbeat is a message sent from one application to another, to which the other application has to respond such that the response is received at the heartbeat sending application within a predetermined response time window. If a response to a heartbeat is not received at or before the predetermined response time, the heartbeat times out. When a heartbeat times out, the heartbeat sender application understands that the data communication link between the heartbeat sender application and the heartbeat receiver/responder application is broken.

Heartbeats and responses to heartbeats can be communicated between applications using a variety of data communication protocols as well. Heartbeat timeouts often cause service disruption, failed or interrupted transactions, and generally degrade system performance.

SUMMARY

The illustrative embodiments provide a method, system, and computer program product for self-adjusting application heartbeat management. An embodiment receives, at a first application executing in a first data processing system from a second application executing in a second data processing system, a response message in response to a heartbeat message. The embodiment identifies information in the response message usable for computing a delay in a future response message for a future heartbeat message, the information communicating to the first application a system condition existing in the second data processing system. The embodiment adjusts a response time using the information to from a modified response time. The embodiment causes receiving of the future response message after the response time.

Another embodiment includes one or more computer-readable, tangible storage devices. The embodiment includes program instructions, stored on at least one of the one or more storage devices, to receive, at a first application executing in a first data processing system from a second application executing in a second data processing system, a response message in response to a heartbeat message. The embodiment includes program instructions, stored on at least one of the one or more storage devices, to identify information in the response message usable for computing a delay in a future response message for a future heartbeat message, the information communicating to the first application a system condition existing in the second data processing system. The embodiment includes program instructions, stored on at least one of the one or more storage devices, to adjust a response time using the information to form a modified response time. The embodiment includes program instructions, stored on at least one of the one or more storage devices, to receive the future response message after the response time.

In another embodiment a computer determines a system load in the computer. The computer populating an option structure with information indicating the system load. The computer adding the option structure to a response message in response to a heartbeat message. The computer sending from a first application executing in a first data processing system to a second application executing in a second data processing system, the response message including the option.

BRIEF DESCRIPTION OF THE SEVERAL VIEWS OF THE DRAWINGS

The novel features believed characteristic of the invention are set forth in the appended claims. The invention itself however, as well as a preferred mode of use, further objectives and advantages thereof, will best be understood by reference to the following detailed description of an illustrative embodiment when read in conjunction with the accompanying drawings, wherein:

DETAILED DESCRIPTION

The invention recognizes that presently, the estimated response time to a heartbeat is computed based on the known delays in the data network using the time stamps on the data packets. The timestamps provide information about how long the packet took to get from the source to the destination over a given data path through the network. Using this information, a roundtrip time for a heartbeat can be calculated. The roundtrip time for a heartbeat as computed using existing methods for heartbeat management is the total time for a heartbeat to traverse the data path from a heartbeat sender application (sender application) and reach a heartbeat receiver application (receiver application), and for a response to that heartbeat to traverse the data path from the receiver application and reach the sender application.

Presently, if one or more heartbeats timeout, i.e., a response to a heartbeat is not received within a response time window, the data link is assumed to be lost or broken. The invention recognizes that in some cases, even with a healthy and sufficiently responsive data network, a heartbeat response can be delayed for other reasons that are not accounted for in the existing methods for heartbeat management.

The invention recognizes, for example, that a receiver application may be executing on a data processing system that may be loaded beyond a threshold system load and the instructions for processing a heartbeat may be delayed at the data processing system of the receiver application. As another example, the processor at the data processing system of the receiver application may be utilized above a threshold utilization, causing the instructions for processing a heartbeat to be delayed.

As another example, the receiver application itself may be experiencing delays that may cause the instructions for processing a heartbeat to be delayed. For example, the receiver application may be executing as a low priority application on the receiver application's data processing system and may not be scheduled for processor cycles until after a calculated response time window. As another example, the receiver application may be experiencing delays in accessing disk or memory causing the response to the heartbeat to be delayed beyond the response time window.

The illustrative embodiments used to describe the invention generally address and solve the above-described problems and other problems related to heartbeat timeouts. The illustrative embodiments provide a method, computer usable program product, and data processing system for self-adjusting application heartbeat management where the response time window can be adjusted to account for ongoing conditions at the receiver application end.

According to an embodiment of the invention, a sender application may be able to adjust the response time window from one heartbeat to another by factoring in receiver application specific conditions, a receiver application's data processing system's conditions, or both, as those conditions change. The application heartbeat management is self-adjusting in that the response time window adjusts automatically based on information about these conditions contained in the responses to previous heartbeats.

A condition in a data processing system where a receiver application may be executing includes the load on the system exceeding a threshold system load, the utilization of the processor exceeding a threshold processor utilization, page faulting exceeding a threshold number of page faults, an I/O latency within the data storage of the data processing system exceeding a threshold, and many other similar events or occurrences. Those of ordinary skill in the art will appreciate that there are many more conditions in a data processing system that can contribute to a delay in the processing of an instruction, such as for responding to a heartbeat, and the same are contemplated within the scope of the invention.

A condition in an application, such as in a receiver application, may be a lower than threshold priority assigned to the application, value or location of certain application data, application induced delay or wait, and many other similar events or occurrences. Those of ordinary skill in the art will appreciate that there are many more conditions in an application that can contribute to a delay in the processing of an instruction, such as for responding to a heartbeat, and the same are contemplated within the scope of the invention.

The illustrative embodiments are described with respect to certain protocols, data, data structures, file systems, file names, directories, and paths only as examples. Such descriptions are not intended to be limiting on the invention. For example, an illustrative embodiment described with respect to TCP/IP may be implemented using another protocol within the scope of the invention. As another example, an illustrative embodiment described with respect to IP version 4 (IPv4) may be implemented using IP version 6 (IPv6).

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are further described with respect to certain applications only as examples. Such descriptions are not intended to be limiting on the invention. An embodiment of the invention may be implemented with respect to any type of application, such as, for example, applications that are served, the instances of any type of server application, a platform application, a stand-alone application, an administration application, or a combination thereof.

An application may further include data objects, code objects, encapsulated instructions, application fragments, services, and other types of resources available in a data processing environment. For example, Java® object, an Enterprise Java Bean (EJB®), a servlet, or an applet may be manifestations of an application with respect to which the invention may be implemented (Java, EJB, and other Java related terminologies are registered trademarks of Sun Microsystems, Inc. or Oracle Corporation in the United States and other countries.)

An illustrative embodiment may be implemented in hardware, software, or a combination thereof. An illustrative embodiment may further be implemented with respect to any type of network communication resource, such as a physical or virtual network interface card, that may be available in a given partitioned data processing system configuration.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

The illustrative embodiments are described using specific code, file systems, designs, architectures, layouts, schematics, and tools only as examples and are not limiting on the illustrative embodiments. Furthermore, the illustrative embodiments are described in some instances using particular software tools and data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 1:
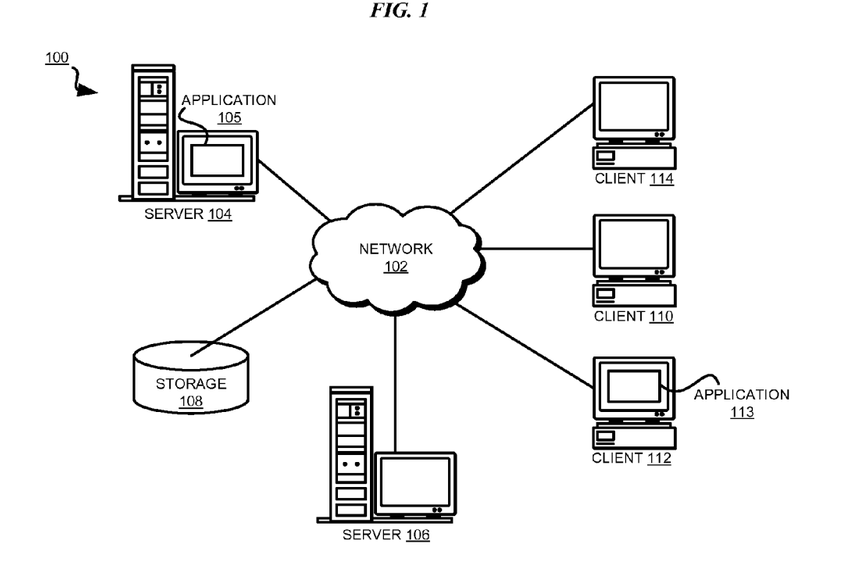
FIG. 1 depicts a pictorial representation of a network of data processing systems in which illustrative embodiments may be implemented.
Figure 2:
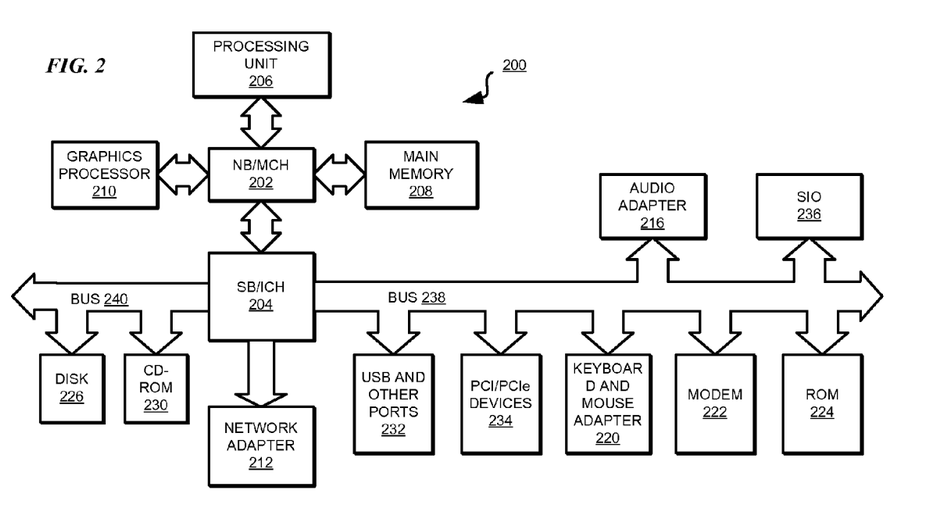
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Server 104 may include application 105 that communicates using a particular data communication protocol. Client 112 may include application 113 that may communicate with application 105 over the selected protocol. For example, applications 105 and 113 may communicate heartbeats and heartbeat response with each other over TCP/IP.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle and/or its affiliates).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
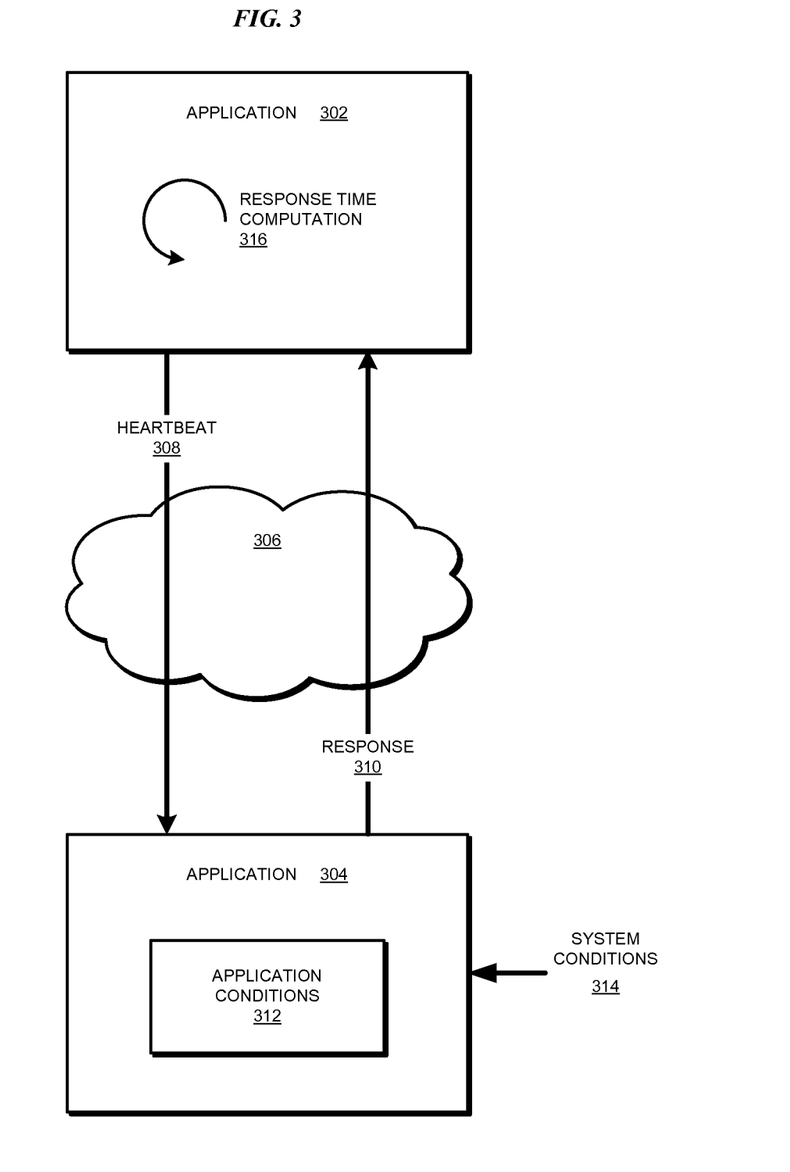
FIG. 3 depicts a block diagram of an improved heartbeat data communication in accordance with an illustrative embodiment.

With reference to FIG. 3, this figure depicts a block diagram of an improved heartbeat data communication in accordance with an illustrative embodiment. Application 302 may be implemented using one of applications 105 or 113 in FIG. 1. Application 304 may be implemented using the other of applications 105 or 113 in FIG. 1. Network 306 may be similar to network 102 in FIG. 1.

Application 302 sends heartbeat 308 to application 304. Application 304 sends response 310 in response to heartbeat 308 to application 302. Application 304 adds information about application conditions 312, system conditions 314, or both in response 310.

Application 302 may employ response time computation algorithm 316. Algorithm 316 utilizes the information about application conditions 312, system conditions 314, or both, from response 310 to provide a self-adjusting application heartbeat management process as described elsewhere in this disclosure. In one embodiment, an existing response time computation algorithm may be modified according to a process described elsewhere in this disclosure to use the information about application conditions 312, system conditions 314, or both, from response 310 and provide a self-adjusting application heartbeat management process.

Figure 4:
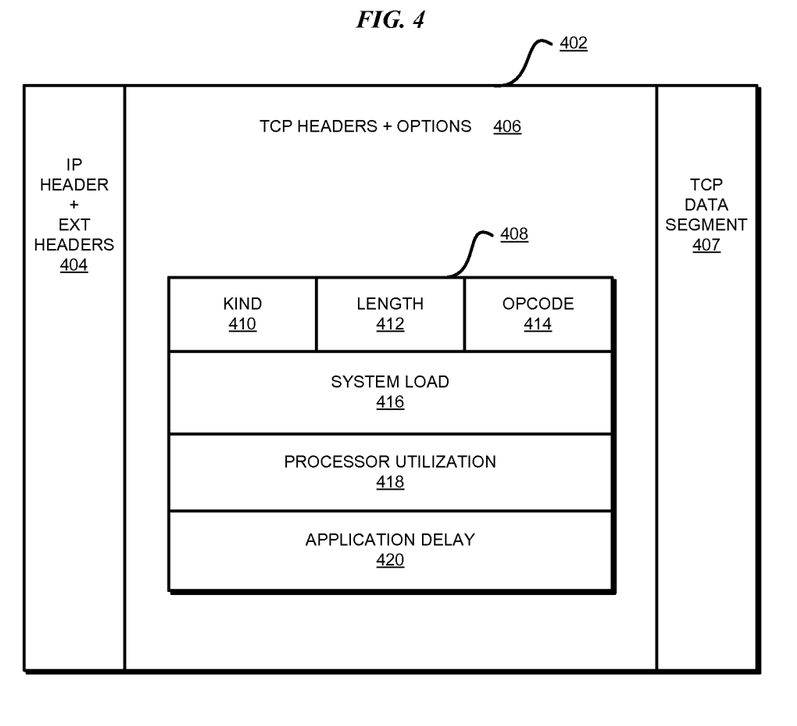
FIG. 4 depicts a block diagram of an example data packet constructed for supporting a self-adjusting application heartbeat management process in accordance with an illustrative embodiment.

With reference to FIG. 4, this figure depicts a block diagram of an example data packet constructed for supporting a self-adjusting application heartbeat management process in accordance with an illustrative embodiment. Packet 402 may be a heartbeat response data packet sent in a heartbeat response, such as response 310 in FIG. 3. Only as an example for the clarity of the description, and without limitation on the invention, packet 402 is constructed as a TCP/IP packet.

Packet 402 includes headers 404, which may include IP headers and certain other headers. Header 406 may include a TCP header and a set of options. Packet 402 may further include data segment 407, which may carry a data payload of packet 402, if any.

An option is a data structure designed to communicate certain optional information. A set of options is one or more options. An option may be present in different locations in different protocols and versions of protocols. For example, in TCP, options can exist in TCP headers. A protocol option header normally follows the protocol main header. An option may be located in any header, place, or position in packet 402 without limitation. Different options may be located in different places within a packet.

Option 408 is constructed according to a TCP/IP specification as an example. Other structures for achieving a similar purpose will be apparent from this disclosure to those of ordinary skill in the art and those structures are contemplated within the scope of the invention.

For example, option 408 may include kind code 410, which identifies the type of option information being carried in option 408. In one embodiment, the kind code may be a code that is not reserved for another purpose in the protocol's specification. In another embodiment, the kind code may be a kind code reserved for a specific purpose but is repurposed for use according to an illustrative embodiment by mutual agreement of the communicating data processing systems.

Length 412 may be the data length occupied by option 408. For example, length 412 may be the number of octets in option 408.

Opcode 414 may be a code. In one embodiment, opcode 414 may indicate how certain information in option 408 should be used. In another embodiment, opcode 414 may indicate what certain information in option 408 represents. In another embodiment, opcode may indicate any combination of these and other directives about certain information in option 408.

In one embodiment, opcode 414 may be accommodated in a single bit, such as to indicate one or two alternatives. In another embodiment, opcode 414 may be several bits long, such as to indicate one of several alternatives, or to indicate a set of flags.

System load 416 may be information about current system load at the data processing system where the sender of packet 402—the receiver application, such as application 304 in FIG. 3—may be executing. System load 416 can be computed in any manner suitable for a particular implementation.

For example, in one embodiment, system load 416 may be the result of a number of processes or threads executing at a given time divided by a number of processors executing those processes or threads. In another example embodiment, system load 416 may be computed from a number of instructions completed per processor cycle. Essentially, system load 416 is an indication of how busy or available the data processing system of the receiver application is at a given time and may be computed using any system parameters that may be suitable in a given environment.

The time of determining system load 416 may be any time within a predetermined time window from the arrival of a heartbeat message. For example, in one embodiment, the time when the system load information is computed may be as soon as possible after the arrival of a heartbeat message and that computed value may be used as system load 416. In another embodiment, the system load information computation may be planned at some predetermined interval, and the most current computed information when a heartbeat arrives may be used as system load 416.

Processor utilization 418 may be information about current workload on a processor at the data processing system where the sender of packet 402—the receiver application, such as application 304 in FIG. 3—may be executing. Processor utilization 418 can be computed in any manner suitable for a particular implementation.

For example, in one embodiment, processor utilization 418 may be the result of a number of clock ticks when the processor is busy divided by a total number of clock ticks during a given period. Essentially, processor utilization 418 is an indication of how busy or available the receiver application's data processing system's processor is at a given time, and may be computed using any suitable parameters.

The time of determining processor utilization 418 may be any time within a predetermined time window from the arrival of a heartbeat message. For example, in one embodiment, the time when the processor utilization information is computed may be as soon as possible after the arrival of a heartbeat message and that computed value may be used as processor utilization 418. In another embodiment, the processor utilization information computation may be planned at some predetermined interval, and the most current computed information when a heartbeat arrives may be used as processor utilization 418.

Application delay 420 may be information about current delays at the sender of packet 402—the receiver application, such as application 304 in FIG. 3—in processing instructions, such as for responding to heartbeat messages. Application delay 420 can be computed in any manner suitable for a particular implementation.

For example, in one embodiment, application delay 420 may be an amount of additional time used by the receiver application to process an instruction while executing at a given priority. In another embodiment, application delay 420 may be a sum or weighted sum of more than one delay amount due to more than one reasons. Essentially, application delay 420 is an indication of how much delay can be attributed to the receiver application itself under the given circumstances of the execution of the receiver application. Application delay 420 may be computed using any suitable application delay related parameters within the scope of the invention.

The time of determining application delay 420 may be any time within a predetermined time window from the arrival of a heartbeat message. For example, in one embodiment, the time when the application delay information is computed may be as soon as possible after the arrival of a heartbeat message and that computed value may be used as application delay 420. In another embodiment, the application delay information computation may be planned at some predetermined interval, and the most current computed information when a heartbeat arrives may be used as application delay 420.

System load 416, processor utilization 418, and application delay 420 are described in option 408 only as examples. Some of these values may be omitted, or other additional or different system condition related information, application condition related information, and more than one instance thereof may be similarly included in option 408 within the scope of the invention. More than one option similar to option 408 may be configured to carry information 416, 418, 420, or similarly purposed information within the scope of the invention.

Furthermore, in one embodiment, option 408 may be populated and carried in each heartbeat response packet. In another embodiment, option 408 may be populated and carried in only certain heartbeat response packets. For example, every n-th packet 402 may include option 408.

In another embodiment, packet 402 sent after a specific event in the data processing system of the receiver application may carry option 408. For example, when a processor outage is detected in the data processing system of the receiver application, or when the receiver application is recovering from a fault, option 408 may be useful to communicate to the sender application that the heartbeat responses may be delayed.

Figure 5:
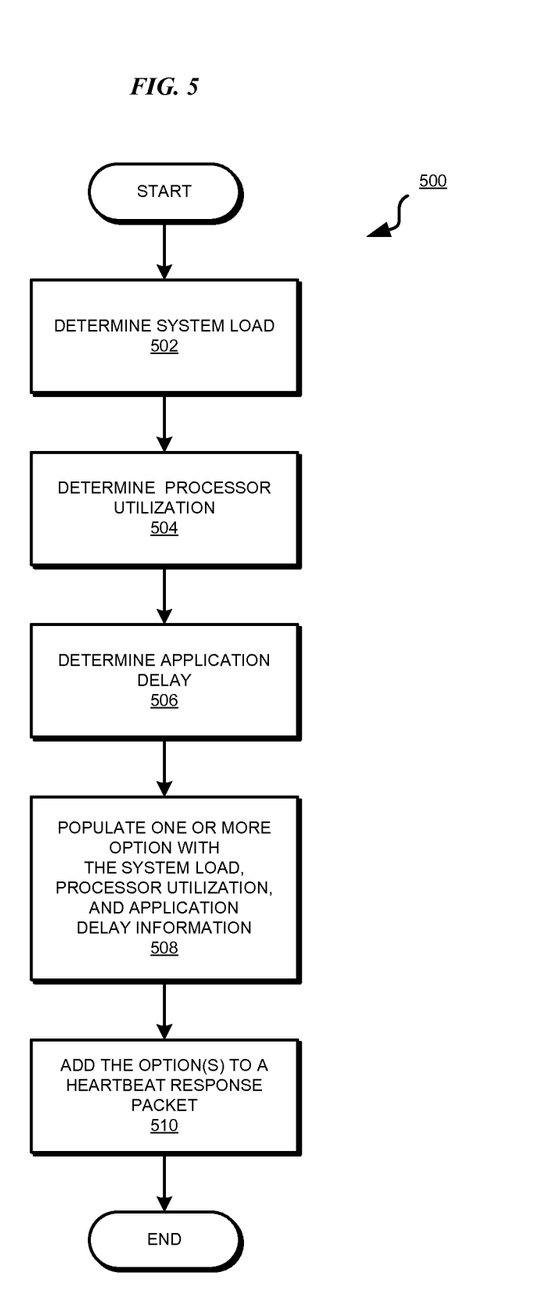
FIG. 5 depicts a flowchart of an example process of creating a heartbeat response for self-adjusting application heartbeat management in accordance with an illustrative embodiment.

With reference to FIG. 5, this figure depicts a flowchart of an example process of creating a heartbeat response for self-adjusting application heartbeat management in accordance with an illustrative embodiment. Process 500 may be implemented in a receiver application, such as application 304 in FIG. 3, or in another application in the data processing system where the receiver application may be executing. Furthermore, process 500 may be implemented to create a heartbeat response packet, such as packet 402 in FIG. 4.

Process 500 begins by determining a system load on the system where the receiver application is executing (block 502). Process 500 determines the utilization of a processor in the system where the receiver application is executing (block 504). Process 500 determines a delay amount attributable to one or more of the receiver application's execution circumstances (block 506).

Process 500 populates one or more options with the information from blocks 502, 504, 506, or any combination thereof (block 508). Process 500 adds the one or more options to a heartbeat response packet (block 510). Process 500 ends thereafter.

For example, one implementation may decide not compute or use the application delays. Another implementation may decide to separately compute and populate application delays caused by different reasons. Similarly, within the scope of the invention, process 500 may be adapted to compute additional system condition-related values, application condition-related values, or both, and populate options with the same.

Figure 6:
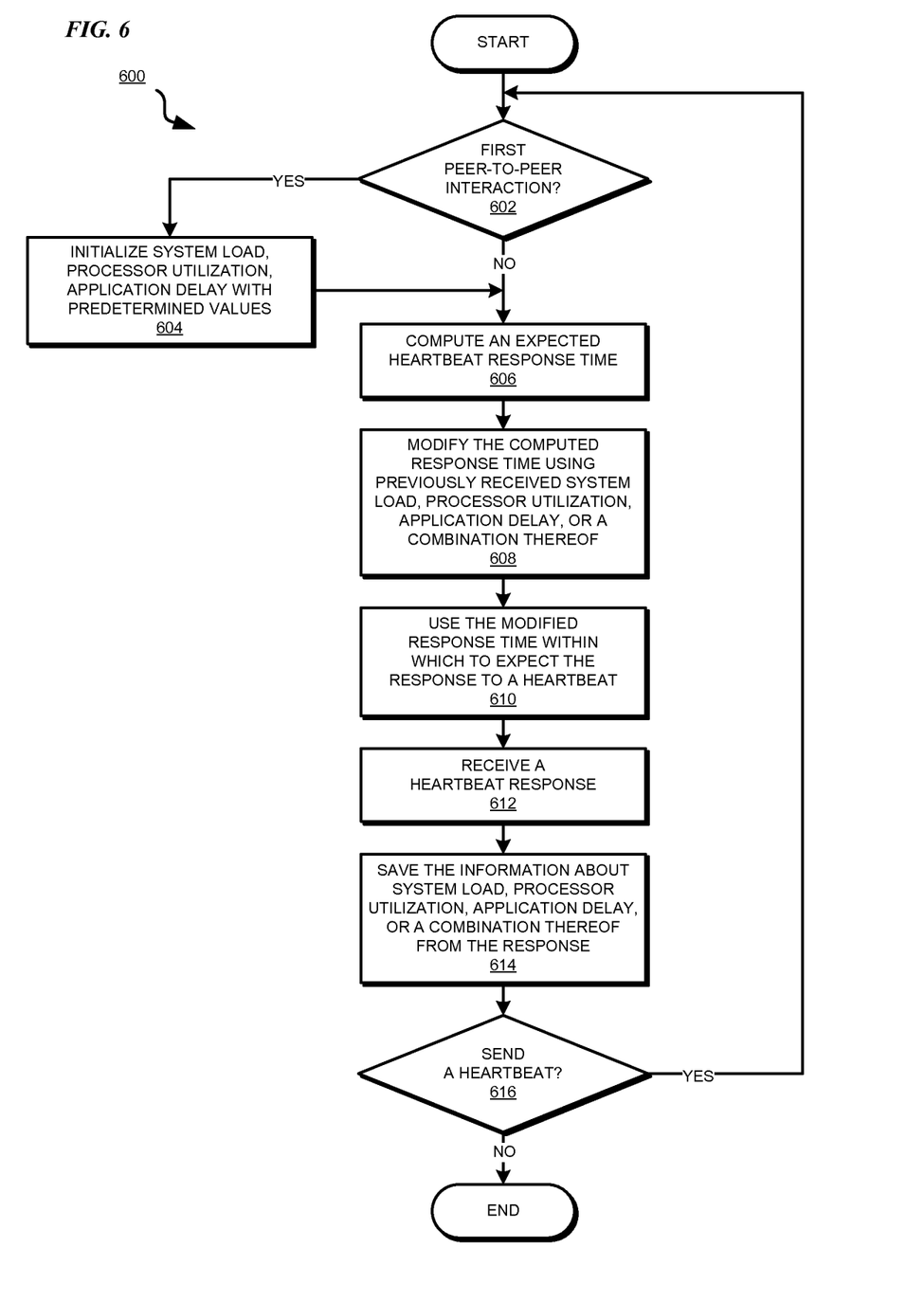
FIG. 6 depicts a flowchart of a self-adjusting application heartbeat management process in accordance with an illustrative embodiment.

With reference to FIG. 6, this figure depicts a flowchart of a self-adjusting application heartbeat management process in accordance with an illustrative embodiment. Process 600 may be implemented in a sender application, such as application 302 in FIG. 3, or in another application in the data processing system where the sender application may be executing. Furthermore, process 600 may be implemented to utilize option information from a heartbeat response packet, such as packet 402 in FIG. 4.

Process 600 begins by determining whether a first peer-to peer interaction, to with, interaction between a sender application and a receiver application, is being undertaken (block 602). If the interaction is the first ("Yes" path of block 602), process 600 initializes the values to be populated in a packet option, for example, the system load information, the processor utilization information, and the application delay information (block 604). Process 600 then proceeds to block 606.

If the interaction between the applications is not the first ("No" path of block 602), or when the option information has been initialized for the first interaction, as in block 604, process 600 computes an expected heartbeat response time or time interval (block 606). The computation of block 606 may be accomplished using any of the existing response time computation algorithms.

Process 600 modifies the computed response time using system load information, processor utilization information, application delay information, or a combination thereof that may have been received previously, such as in a previous heartbeat response packet (block 608). Block 606, 608, or both, may be implemented as a self-adjusting application heartbeat management algorithm according to an embodiment. The following pseudo-code may be an example implementation of such a self-adjusting application heartbeat management algorithm—

```
algorithm
{
    old_system_load = 0
    receive acknowledgement
    {
        extract real response (round trip) time from
        packet
        If TCP option for factored response time is
        present
        {
            extract system load and processor
            utilization from packet
        }
        if old_system_load == 0
        {
```

-continued

```
        /* First time around we want to avoid
        factoring in system load because
        old_system_load is 0 */
        old_system_load = new_system_load
    }
    virtual response time = real response time +
    (response time * processor utilization)
    delta system load = new_system_load −
    old_system_load
    If absolute(delta system load) > threshold
    {
        /* First time case will not enter here
        because delta will be 0 */
        Virtual response time = Virtual response
        time + (delta system load * load_factor)
        where load_factor is a predefined number
        that determines how aggressively we want to
        track the change in system load.
        /* Cap virtual response time */
        virtual response time = MAX ( MIN ( virtual
        response time , max response time) , min
        response time )
    }
    old_system_load = new_system_load
  }
}
```

In the above described example self-adjusting application heartbeat management algorithm, the virtual response time is the modified response time computed in block 608 of process 600. Process 600 uses the modified response time (or time interval) computed in block 608 to determine the time window within which to expect the response to a heartbeat message (block 610). If process 600 does not receive a heartbeat response within this time window, process 600 may determine that the peer-to-peer data communication link is indeed broken (not shown in FIG. 6).

Process 600 receives a heartbeat response (block 612). The heartbeat response can be in the form of packet 402 of FIG. 4. Process 600 saves the option information from the response, such as the system load information, processor utilization information, application delay information, or a combination thereof (block 614). The saved information may be used for adjusting the response time windows for future one or more heartbeat responses.

Process 600 determines whether another heartbeat is to be sent (block 616). If another heartbeat message is to be sent ("Yes" path of block 616), process 600 returns to block 602. If no more heartbeats are to be sent ("No" path of block 616), process 600 ends thereafter.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for a self-adjusting application heartbeat management process. Using an embodiment of the invention, a service disruption due to a delayed response to a heartbeat may be avoided.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for self-adjusting application heartbeat management, the method comprising:

a first data processing system receiving, at a first application executing in the first data processing system, from a second application executing in a second data processing system, a response message in response to a heartbeat message;

the first data processing system identifying information in the response message usable for computing a delay in responding to a future heartbeat message with a future response message, the information communicating to the first application a system condition existing in the second data processing system, wherein the information is contained in an option in a header in the response message, wherein the option includes a code indicating a manner of using the information, wherein the heartbeat message is a Transmission control protocol (TCP) message sent from the first application to the second application, wherein the response message is a second TCP message sent from the second application to the first application, and wherein the option includes one of (i) a kind code that describes a type of the information and that is not reserved in a specification of the response message, and (ii) a kind code that describes a type of the information and that is reserved in a specification of the response message but is repurposed to indicate the type of the information;

the first data processing system adjusting a response time using the information to form a modified response time; and the first data processing system receiving the future response message after the response time.

2. The method of claim 1, wherein receiving the future response message occurs before the modified response time, further comprising:

the first data processing system concluding that a data communication link between the first and the second application has not been lost.

3. The method of claim 1, wherein receiving the future response message occurs after the modified response time, further comprising:

the first data processing system concluding that a data communication link between the first and the second application has been lost.

4. The method of claim 1, wherein the system condition is a load on the second data processing system exceeding a system load threshold, and the information includes a system load value.

5. The method of claim 1, wherein the system condition is a processor utilization in the second data processing system exceeding a processor utilization threshold, and the information includes a processor utilization value.

6. The method of claim 1, wherein the information further communicates to the first application an application condition existing in the second application.

7. The method of claim 6, wherein the application condition is a delay caused by a lower than threshold priority at which the second application is executing on the second data processing system.

8. The method of claim 1, wherein the option includes more than one instance of the information, different instances of the information indicating different conditions existing at the second data processing system.

9. A computer program product comprising one or more computer-readable, tangible storage devices and computer-readable program instructions which are stored on the one or more storage devices and when executed by one or more processors, perform the method of claim 1.

10. A computer system comprising one or more processors, one or more computer-readable memories, one or more computer-readable, tangible storage devices and program instructions which are stored on the one or more storage devices for execution by the one or more processors via the one or more memories and when executed by the one or more processors perform the method of claim 1.

11. A computer program product for self-adjusting application heartbeat management, the computer program product comprising:
one or more computer-readable, tangible storage devices;
program instructions, stored on at least one of the one or more storage devices, to receive, at a first application executing in a first data processing system from a second application executing in a second data processing system, a response message in response to a heartbeat message;
program instructions, stored on at least one of the one or more storage devices, to identify information in the response message usable for computing a delay responding to a future heartbeat message with a future response message, the information communicating to the first application a system condition existing in the second data processing system, wherein the information is contained in an option in a header in the response message, wherein the option includes a code indicating-a manner of using the information, wherein the heartbeat message is a Transmission control protocol (TCP) message sent from the first application to the second application, wherein the response message is a second TCP message sent from the second application to the first application, and wherein the option includes one of (i) a kind code that describes a type of the information and that is not reserved in a specification of the response message, and (ii) a kind code that describes a type of the information and that is reserved in a specification of the response message but is repurposed to indicate the type of the information;
program instructions, stored on at least one of the one or more storage devices, to adjust a response time using the information to form a modified response time; and
program instructions, stored on at least one of the one or more storage devices, to receive the future response message after the response time.

12. The computer program product of claim 11, further comprising:
program instructions, stored on at least one of the one or more storage devices, to receive the future response message before the modified response time; and
program instructions, stored on at least one of the one or more storage devices, to conclude that a data communication link between the first and the second application has not been lost.

13. The computer program product of claim 11, further comprising:
program instructions, stored on at least one of the one or more storage devices, to receive the future response message after the modified response time; and
program instructions, stored on at least one of the one or more storage devices, to conclude that a data communication link between the first and the second application has been lost.

14. The computer program product of claim 11, wherein the system condition is a load on the second data processing system exceeding a system load threshold, and the information includes a system load value.

15. The computer program product of claim 11, wherein the program instructions to receive the response message, the program instructions to identify the information, the program instructions to adjust the response time, and the program instructions to receive the future response message are stored in the one or more computer-readable tangible storage devices in a data processing system, and wherein the program instructions to receive the response message, the program instructions to identify the information, the program instructions to adjust the response time, and the program instructions to receive the future response message are transferred over a network from a remote data processing system.

16. The computer program product of claim 11, wherein the program instructions to receive the response message, the program instructions to identify the information, the program instructions to adjust the response time, and the program instructions to receive the future response message are stored in the one or more computer-readable tangible storage devices in a server data processing system, and wherein the program instructions to receive the response message, the program instructions to identify the information, the program instructions to adjust the response time, and the program instructions to receive the future response message are downloaded over a network to a remote data processing system for use in a computer-readable tangible storage device associated with the remote data processing system.

17. A method for self-adjusting application heartbeat management, the method comprising:
a first data processing system determining a system load in the first data processing system;
the first data processing system populating an option structure with information indicating the system load;
the first data processing system adding the option structure to a response message in response to a heartbeat message; and
the first data processing system sending the response message from a first application executing in the first data processing system to a second application executing in a second data processing system, the information being usable for computing a delay in responding with a future response message from the first data processing system in response to a future heartbeat message received at the first data processing system, the information communicating to the second application in the second data processing system a system condition existing in the first data processing system, wherein the information is contained in the option in a header in the response message, wherein the option includes a code indicating a manner of using the information, wherein the heartbeat message is a Transmission control protocol (TCP) message sent from the first application to the second application, wherein the response message is a second TCP message sent from the second application to the first application, and wherein the option includes one of (i) a kind code that describes a type of the information and that is not reserved in a specification of the response message, and (ii) a kind code that describes a type of the information and that is reserved in a specification of the response message but is repurposed to indicate the type of the information.

18. The method of claim 17, further comprising:
the first data processing system determining a processor utilization in the first data processing system;

the first data processing system populating a second option structure with information indicating the processor utilization;

the first data processing system adding the second option structure to the response message, the information indicating the processor utilization being usable for computing the delay in responding with the future response message from the first data processing system in response to the future heartbeat message received at the first data processing system, the information indicating the processor utilization communicating to the second application in the second data processing system another system condition existing in the first data processing system.

19. The method of claim 17, further comprising:

the first data processing system determining an application delay associated with the first application executing in the first data processing system;

the first data processing system populating a second option structure with information indicating the application delay;

the first data processing system adding the second option structure to the response message, the information indicating the application delay being usable for computing the delay in responding with the future response message from the first data processing system in response to the future heartbeat message received at the first data processing system, the information indicating the application delay communicating to the second application in the second data processing system another system condition existing in the first data processing system.

\* \* \* \* \*